M. W. TRESCOTT.
Improvement in Horse Hay-Rakes.

No. 115,909.

Patented June 13, 1871.

Witnesses:
E. Wolff
Wm. H. C. Smith

Inventor:
M. W. Trescott

PER

Attorneys.

UNITED STATES PATENT OFFICE.

MARTIN W. TRESCOTT, OF NORTH CANAAN, CONNECTICUT.

IMPROVEMENT IN HORSE HAY-RAKES.

Specification forming part of Letters Patent No. 115,909, dated June 13, 1871.

*To all whom it may concern:*

Be it known that I, MARTIN W. TRESCOTT, of North Canaan, in the county of Litchfield and State of Connecticut, have invented a new and useful Improvement in Horse Hay-Rakes; and I do hereby declare that the following is a full, clear, and exact description thereof, which will enable others skilled in the art to make and use the same, reference being had to the accompanying drawing forming part of this specification.

This invention relates to improvements in horse hay-rakes; and it consists in an improved arrangement of means for attaching the ordinary turning-rake to a truck, whereon the driver may manipulate the rake while riding, and by which it may be supported above the ground for transporting it to and from the field.

Figure 1:
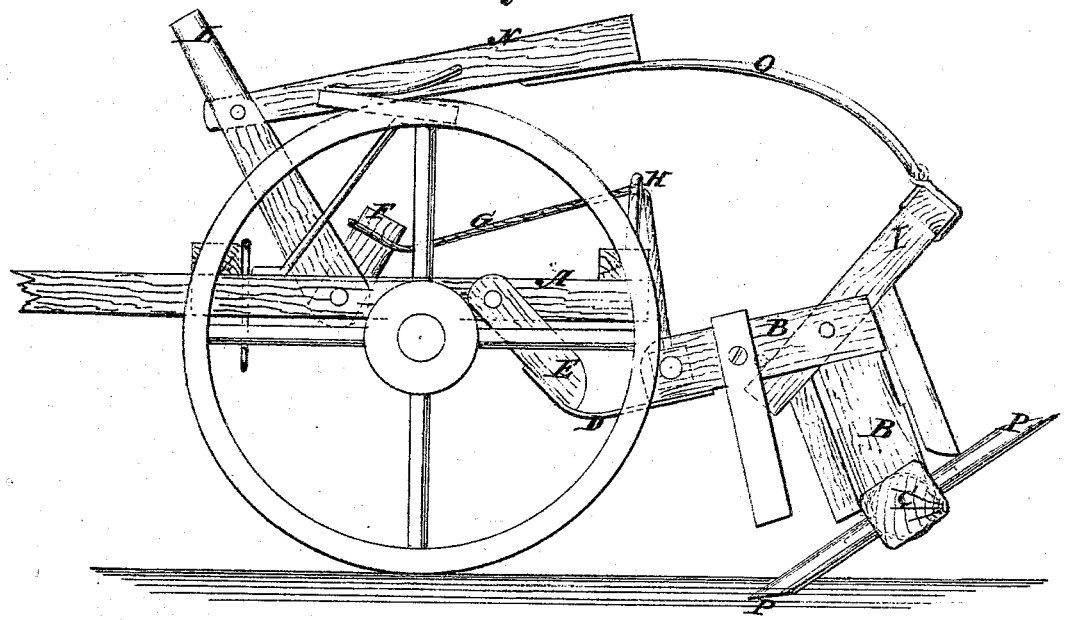
Figure 2:
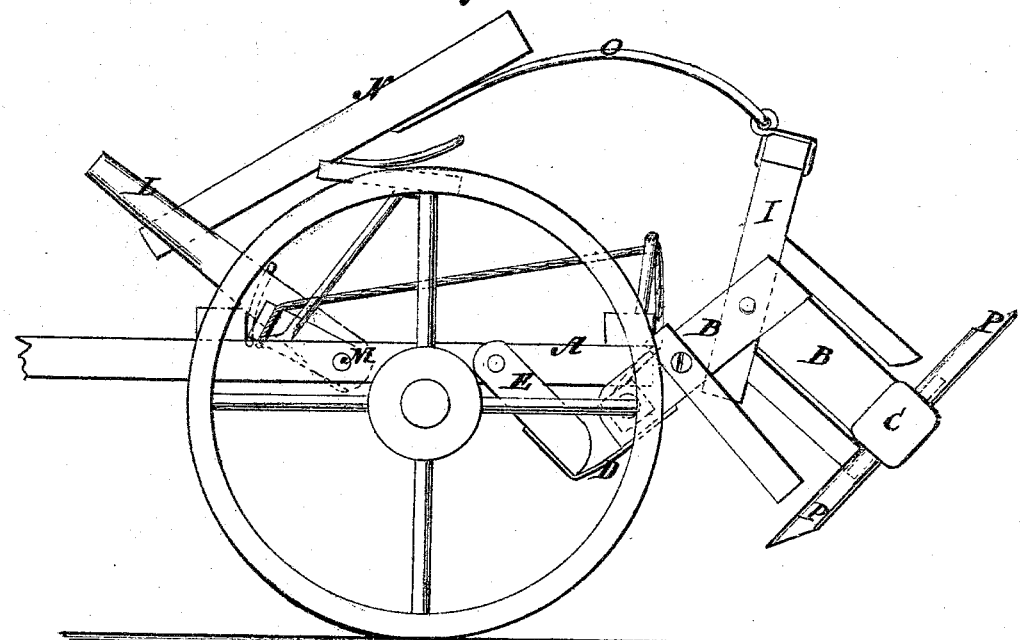

Figure 1 is a side elevation of my improved machine, showing the rake in the position for turning; and Fig. 2 is a side elevation of the same, showing the rake in the elevated position for transporting.

Similar letters of reference indicate corresponding parts.

A represents the frame of an ordinary two-wheeled vehicle; B, the frame of an ordinary turning-rake; and C, the rake-head. I propose to connect the rake to the frame of the truck by leather or other flexible straps, D, made fast at one end to the rake-frame, as shown, and at the other end to the blocks or bars E, pivoted to the frame so as to oscillate vertically. The rake is drawn by these connections, which allow the requisite lateral and vertical play of the parts, due to the uneven surface. I also connect the front cross-bar of the rake to the block or foot-lever F, pivoted near the front of the truck-frame, by a cord or chain, G, which works over a guide or pulley at H for lifting the rake off the ground; and, finally, I connect the handles I of the rake with a hand-lever, L, pivoted to the frame at M by a bar, N, and rod O, or any equivalent thereof, by which the rake-handles may be raised to cause the points of the teeth P to catch in the ground to turn the rake; or by lifting the handles at the same time the front of the frame is lifted by the lever F and rope G, the rake will be lifted wholly off the ground, as indicated in Fig. 2.

Having thus described my invention, I claim as new, and desire to secure by Letters Patent—

The attachment of the rake to the truck-frame by the flexible drawing-straps D and pivoted bars E, the lifting-rope G and the lever F, and the bar N O and lever L, all substantially as specified.

The above specification of my invention signed by me this 13th day of December, 1870.

MARTIN W. TRESCOTT.

Witnesses:
GEO. W. MABEE,
T. B. MOSHER.